United States Patent
Franco et al.

(10) Patent No.: US 11,132,419 B1
(45) Date of Patent: Sep. 28, 2021

(54) CONFIGURING OUTPUT CONTROLS ON A PER-ONLINE IDENTITY AND/OR A PER-ONLINE RESOURCE BASIS

(71) Applicant: Oath Inc., Dulles, VA (US)

(72) Inventors: Alexander Franco, Herndon, VA (US); David S. Bill, San Francisco, CA (US)

(73) Assignee: Verizon Media Inc., New York, NY (US)

( * ) Notice: Subject to any disclaimer, the term of this patent is extended or adjusted under 35 U.S.C. 154(b) by 356 days.

(21) Appl. No.: 15/131,245

(22) Filed: Apr. 18, 2016

Related U.S. Application Data

(62) Division of application No. 11/865,852, filed on Oct. 2, 2007, now Pat. No. 9,338,399.

(60) Provisional application No. 60/882,873, filed on Dec. 29, 2006.

(51) Int. Cl.
| | | |
|---|---|---|
| *G06F 17/00* | (2019.01) | |
| *G06F 16/958* | (2019.01) | |
| *G06F 3/16* | (2006.01) | |
| *G06F 16/9535* | (2019.01) | |

(52) U.S. Cl.
CPC .......... *G06F 16/958* (2019.01); *G06F 3/165* (2013.01); *G06F 16/9535* (2019.01)

(58) Field of Classification Search
CPC ... G06F 16/958; G06F 16/9535; G06F 16/165
USPC ............................................ 700/94; 381/107
See application file for complete search history.

(56) References Cited

U.S. PATENT DOCUMENTS

| | | | | |
|---|---|---|---|---|
| 5,594,859 | A  * | 1/1997 | Palmer ................ | G06F 3/04847 348/E7.081 |
| 6,798,889 | B1 * | 9/2004 | Dicker .................... | H04S 7/301 381/103 |
| 7,006,616 | B1 * | 2/2006 | Christofferson .... | H04L 12/1822 379/202.01 |
| 7,190,948 | B2 | 3/2007 | Donley et al. | |
| 7,769,811 | B2 * | 8/2010 | Heikes .................. | H04M 19/04 709/206 |
| 7,839,803 | B1 * | 11/2010 | Snelgrove ............... | H04M 3/56 370/235 |
| 8,615,316 | B2 * | 12/2013 | Oh ........................ | G10L 19/008 700/94 |

(Continued)

OTHER PUBLICATIONS

ID3v2 Technical specificaiton; copyright 1998.*

*Primary Examiner* — Paul C McCord
(74) *Attorney, Agent, or Firm* — Bookoff McAndrews, PLLC

(57) ABSTRACT

A process includes receiving, from a user identity, instructions for output characteristics including one or more of audio characteristics for rendering or capturing audio data or visual characteristics for rendering or capturing visual data. The process also includes determining, in response to the received instructions, output controls which effect the one or more of audio characteristics or visual characteristics, and associating the output controls with an online identity or resource. The process further includes storing the associated output controls and detecting an interaction with the online identity or resource. Moreover, the process includes accessing, in response to the detection of the interaction, the stored output controls, and enabling an effect, based on the output controls, of one or more of the audio characteristics or the visual characteristics with respect to interaction with the online identity or resource.

19 Claims, 6 Drawing Sheets

(56) References Cited

U.S. PATENT DOCUMENTS

| | | | |
|---|---|---|---|
| 2002/0136166 A1* | 9/2002 | Armbruster | H04L 12/1813 370/250 |
| 2003/0202107 A1* | 10/2003 | Slattery | H04N 7/142 348/207.99 |
| 2004/0008635 A1 | 1/2004 | Nelson et al. | |
| 2004/0085259 A1* | 5/2004 | Tarlton | H04M 1/72544 345/2.3 |
| 2004/0179038 A1* | 9/2004 | Blattner | H04L 51/00 715/751 |
| 2004/0236830 A1* | 11/2004 | Nelson | H04L 29/06027 709/204 |
| 2005/0130638 A1* | 6/2005 | Schrader | H04M 7/003 455/416 |
| 2005/0143108 A1* | 6/2005 | Seo | G06F 17/211 455/466 |
| 2005/0171997 A1* | 8/2005 | Seo | H04M 1/72525 709/202 |
| 2005/0223328 A1* | 10/2005 | Ashtekar | H04N 21/235 715/706 |
| 2005/0261032 A1* | 11/2005 | Seo | A63F 13/12 455/566 |
| 2006/0073816 A1* | 4/2006 | Kim | H04M 1/72544 455/414.1 |
| 2006/0143569 A1* | 6/2006 | Kinsella | G06Q 10/107 715/752 |
| 2006/0170945 A1* | 8/2006 | Bill | G06F 17/30749 358/1.13 |
| 2006/0178975 A1* | 8/2006 | Jung | G06Q 20/10 705/35 |
| 2006/0227142 A1* | 10/2006 | Brown | G06F 17/211 345/473 |
| 2006/0294465 A1* | 12/2006 | Ronen | H04M 1/576 715/706 |
| 2007/0022172 A1* | 1/2007 | Anglin | G06Q 10/10 709/207 |
| 2007/0255437 A1* | 11/2007 | Vernon | H04R 29/00 700/94 |
| 2008/0037749 A1* | 2/2008 | Metzger | H04M 3/56 379/202.01 |
| 2008/0049943 A1* | 2/2008 | Faller | G10L 19/008 381/17 |
| 2008/0068448 A1* | 3/2008 | Hansen | H04N 7/147 348/14.09 |
| 2008/0141175 A1* | 6/2008 | Sarna | H04L 29/06027 715/848 |
| 2008/0155080 A1* | 6/2008 | Marlow | H04L 12/66 709/223 |
| 2009/0067634 A1* | 3/2009 | Oh | H04S 3/008 381/17 |
| 2011/0173521 A1* | 7/2011 | Horton | G06Q 30/02 715/202 |
| 2011/0212736 A1* | 9/2011 | Jaime | H04L 51/26 455/466 |

* cited by examiner

Output Controls for Online Identities
Define output controls for communications with the selected online identity Online Identity: BestFriend

AUDIO CONTROLS

| Sound | Volume Setting | Mute After? |
|---|---|---|
| Avatar | 3 | 30 minutes |
| Smileys | 7 | 10 minutes |
| VoIP Session | 10 | Never |
| Music Player | 5 | Never |
| Notifications | 8 | Never |
| Add more. | | |

DISPLAY CONTROLS

Message Priority
- ⦿ Highest
- ○ High
- ○ Medium
- ○ Low
- ○ Lowest

Items to be Displayed
- ☑ Avatar
- ☐ Background Images
- ☑ Images Received
- ☐ Web Page Previews
- ☐ Video Add more...

Font
Name: Arial
Size: 12
Color: Purple

APPLICATION CONTROLS

| Application | Launch When |
|---|---|
| Hearts Game | text includes "play" |
| Browser | receive link |
| Music Player | receive IM from online identity |
| Video Player | receive video |
| Word Processor | text includes "document" |
| Download Files | if file type .jpg or .doc |
| Add more... | |

610 — Receive, from a user, instructions for an audio control indicating that sounds associated with an avatar are to be played at a volume setting of 3 and are to be muted 30 minutes after initiation of a communications session between the user and an online identity of "BestFriend"

620 — Store the audio control in association with the online identity "BestFriend"

630 — Detect an instant message received by the user from the online identity "BestFriend"

640 — Play sounds associated with an avatar displayed in connection with the communications session between the user and the online identity "BestFriend" at a volume setting of 3, and muting the avatar sounds after 30 minutes

Fig. 6

CONFIGURING OUTPUT CONTROLS ON A PER-ONLINE IDENTITY AND/OR A PER-ONLINE RESOURCE BASIS

CROSS-REFERENCE TO RELATED APPLICATIONS

This application is a divisional of and claims priority to U.S. patent application Ser. No. 11/865,852, filed Oct. 2, 2007, which claims priority to U.S. Provisional Application No. 60/882,873, filed Dec. 29, 2006. The entire contents of the above-referenced applications are hereby incorporated by reference.

BACKGROUND

Computer applications generate output in a variety of manners. For example, a web site may display text and video, and generate audio sounds. The audio sounds may be rendered by accessing an audio file embedded in a web site.

SUMMARY

In one general aspect, a method includes receiving instructions for output characteristics for audio communication sessions, the audio communication sessions being associated with a first identity. The output characteristics include a first volume level for audio communication sessions between the first identity and a second identity, and a second volume level for audio communication sessions between the first identity and a third identity. The first volume level is different than the second volume level. The method also includes determining, in response to the received instructions, audio output controls for audio communication sessions associated with the first identity, and associating the output controls with the first identity. The method further includes storing the associated output controls, detecting an audio communication session associated with the first identity, and accessing, in response to the detection, the stored output controls. Also, method includes enabling rendering of the first volume level for the audio communication session based on the audio output controls dependent on whether the audio communication session is between the first identity and the second identity. Moreover, the method includes enabling rendering of the second volume level for the audio communication session based on the audio output controls dependent on whether the audio communication session is between the first identity and the third identity.

In another general aspect, a method includes receiving, from a user identity, instructions for output characteristics including one or more of audio characteristics for rendering or capturing audio data or visual characteristics for rendering or capturing visual data. The method also includes determining, in response to the received instructions, output controls which effect the one or more of audio characteristics or visual characteristics, and associating the output controls with an online identity or resource. The method further includes storing the associated output controls and detecting an interaction with the online identity or resource. Moreover, the method includes accessing, in response to the detection of the interaction, the stored output controls, and enabling an effect, based on the output controls, of one or more of the audio characteristics or the visual characteristics with respect to interaction with the online identity or resource.

Implementations may include one or more of the features noted above. In addition, implementations may include associating the output controls with the user identity and an online identity, detecting an interaction between the user identity and the online identity; and enabling an effect, based on the output controls, of one or more of the audio characteristics or the visual characteristics with respect to interaction with the online identity. Also, the online identity may be a first user with a first screen name, and enabling an effect may include detecting initiation or existence of an instant messaging communications session with the first user. Further, audio output related to the instant messaging communications session may be rendered using audio controls included in the output controls or an instant messaging related to the instant messaging communications session may be rendered using visual controls included in the output controls.

Also, rendering audio output related to the instant messaging communications session using the audio controls may include capturing particular sounds using a microphone level indicated in the audio controls. Rendering audio output related to the instant messaging communications session using the audio controls may include rendering particular sounds indicated in the audio controls based on volume settings associated with the particular sounds or a microphone and included in the audio controls, and muting the particular sounds after an amount of time associated with the particular sounds and included in the audio controls has elapsed. The visual controls may include a priority setting, and rendering the instant messaging related to the instant messaging communications session using the visual controls may include accessing the priority setting as at least one of the stored output controls, and rendering an instant messaging at a forefront based on whether the priority setting indicates that communications with the first screen name should be prioritized. An instant messaging related to the instant messaging session may be rendered in a subdued manner based on whether the priority setting indicates that communications with the first screen name should be subdued. The visual controls may include a list of items to be displayed, and rendering the instant messaging related to the instant messaging communications session using the visual controls may include rendering the items included in the list of items.

Further, receiving instructions for output characteristics including audio characteristics for rendering or capturing audio data may include receiving instructions for output characteristics including an indication of microphone volume level for capturing audio. Receiving instructions for output characteristics including visual characteristics for rendering or capturing visual data may include receiving instructions for output characteristics including an indication of webcam brightness level for capturing visual data. Also, the output controls may be associated with the user identity and an online resource, an interaction may be detected between the user identity and the online resource, and an effect may be enabled, based on the output controls, of one or more of the audio characteristics or the visual characteristics with respect to interaction with the online resource. Receiving instructions for output characteristics may include receiving instructions for output controls that are associated with a web page. Detecting an interaction may include detecting a browser navigating to the web page, and enabling an effect may include controlling audio characteristics of the web page or visual characteristics of the web page based on the output controls associated with the web page. Enabling an effect may include controlling audio characteristics of the web page. Enabling an effect may include controlling visual characteristics of the web page.

Moreover, the general aspect may include receiving instructions for output characteristics that are associated with email messages that meet particular criteria. Detecting an interaction between the user identity and the online resource may include detecting receipt of an email message that meets the particular criteria and enabling an effect may include controlling how to play sounds included in the email message or how to render video included in the email message. Receiving instructions may include receiving instructions for output controls that are associated with media that meets particular criteria. Detecting an interaction may include detecting rendering, capture, or playback of media that meets the particular criteria, and enabling an effect may include controlling audio characteristics associated with the media or visual characteristics associated with the media.

Also, the general aspect may include receiving instructions for output controls that are associated with the online identity. The online identity may be a first user with a first screen name, and enabling an effect may include detecting initiation or existence of an instant messaging communications session with the first user, and may include one or more of rendering audio output related to the instant messaging communications session using audio controls included in the output controls or rendering an instant messaging related to the instant messaging communications session using visual controls included in the output controls. Rendering audio output related to the instant messaging communications session using the audio controls may include capturing particular sounds using a microphone level indicated in the audio controls. Rendering audio output related to the instant messaging communications session using the audio controls may include rendering particular sounds indicated in the audio controls based on volume settings associated with the particular sounds or a microphone and included in the audio controls and muting the particular sounds after an amount of time associated with the particular sounds and included in the audio controls has elapsed. The visual controls may include a priority setting, and rendering the instant messaging related to the instant messaging communications session using the visual controls may include rendering an instant messaging at a forefront based on whether the priority setting indicates that communications with the first screen name should be prioritized and rendering an instant messaging related to the instant messaging session in a subdued manner based on whether the priority setting indicates that communications with the first screen name should be subdued. The visual controls may include a list of items to be displayed, and rendering the instant messaging related to the instant messaging communications session using the visual controls may include rendering the items included in the list of items.

Further, the general aspect may include receiving, from a second user identity, second instructions for second output characteristics including one or more of audio characteristics for rendering or capturing audio data or visual characteristics for rendering or capturing visual data, where the second output characteristics are different than the output characteristics, determining, in response to the received second instructions, second output controls which effect the one or more of audio characteristics or visual characteristics, where the second output controls are different than the output controls, associating the second output controls with the second user identity and the online identity or resource, and storing the associated second output controls.

Moreover, the general aspect may include detecting an interaction with the online identity or resource. Dependent on whether the interaction is with the user identity, the general aspect may include accessing, in response to the detection of the interaction, the stored output controls, enabling an effect, based on the output controls, of one or more of the audio characteristics or the visual characteristics with respect to interaction with the online identity or resource. Also, dependent on whether interaction is with the second user identity, the general aspect may include accessing, in response to the detection of the interaction, the stored second output controls, and enabling an effect, based on the second output controls, of one or more of the audio characteristics or the visual characteristics with respect to interaction with the online identity or resource. Enabling an effect, based on the output controls may include enabling an effect of the audio characteristics and enabling an effect, based on the second output controls may include enabling an effect of the visual characteristics. Enabling an effect, based on the output controls may include enabling an effect of a low audio volume, and enabling an effect, based on the second output controls may include enabling an effect of a high audio volume.

Furthermore, the general aspect may include receiving, from the user identity, second instructions for second output characteristics including one or more of audio characteristics for rendering or capturing audio data or visual characteristics for rendering or capturing visual data wherein the second output characteristics are different than the output characteristics, determining, in response to the received second instructions, second output controls which effect the one or more of audio characteristics or visual characteristics wherein the second output controls are different than the output controls, associating the second output controls with the second user identity and a feature of the online identity or resource, and storing the second output controls in association with the user identity and the online identity or resource. An interaction may be detected with the online identity or resource. Dependent on whether the interaction is with the online identity or resource, the general aspect may include accessing, in response to the detection of the interaction, the stored output controls, and enabling an effect, based on the output controls, of one or more of the audio characteristics or the visual characteristics with respect to interaction with the online identity or resource. Also, dependent on whether interaction is with the feature of the online identity or resource, the general aspect may include accessing, in response to the detection of the interaction, the stored second output controls, and enabling an effect, based on the second output controls, of one or more of the audio characteristics or the visual characteristics with respect to interaction with the online identity or resource. Enabling an effect, based on the output controls may include enabling an overall volume level, and enabling an effect, based on the second output controls may include enabling a volume for the specific feature. The overall volume level may be an overall volume level of a running instant messaging program, and the specific feature may be a volume associated with incoming messages.

Additionally, the general aspect may include receiving instructions for output characteristics including a volume level, determining output controls which effect the volume level, enabling an effect, based on the output controls, of the volume level with respect to interaction with the online identity or resource, and sending the data associated with the interaction with the online identity or resource to the user. Also, the general aspect may include receiving instructions for output characteristics including a volume level, determining output controls which effect the volume level, sending data associated with the interaction with the online identity or resource to the user identity, and enabling an effect, based on the output controls, of the volume level with respect to interaction with the online identity or resource. Further, the general aspect may include receiving instructions for output characteristics of audio characteristics of instant message communications with a first user, detecting initiation or existence of a first instant messaging communications session with the first user and a second instant messaging communications session with a second user, enabling rendering of audio output related to the second instant messaging communications session without an effect based on the output controls, where enabling an effect includes enabling rendering of audio output related to the first instant messaging communications session using audio controls included in the output controls.

In a further general aspect, a computer program product include instructions that, when executed by a processor, cause the processor to receive, from a user identity, instructions for output characteristics including one or more of audio characteristics for rendering or capturing audio data or visual characteristics for rendering or capturing visual data. The instruction also cause the processor to determine, in response to the received instructions, output controls which effect the one or more of audio characteristics or visual characteristics and associate the output controls with the user identity and an online identity or resource. Also, the instructions cause the processor to store the associated output controls and detect an interaction with the online identity or resource. Further, the instructions cause the processor to access, in response to the detection of the interaction, the stored output controls enable an effect, based on the output controls, of one or more of the audio characteristics or the visual characteristics with respect to interaction with the online identity or resource.

In an additional general aspect, a method includes receiving, from an identity entered by a user to access computer or network resources, instructions for output characteristics including one or more of audio characteristics for rendering or capturing audio data or visual characteristics for rendering or capturing visual data. The method also includes determining, in response to the received instructions, output controls which effect the one or more of audio characteristics or visual characteristics and associating the output controls with the identity and an online identity or resource. The method further includes storing the associated output controls and detecting an interaction between the identity and the online identity or resource. In addition, the method includes accessing, in response to the detection of the interaction, the stored output controls and enabling an effect, based on the output controls, of one or more of the audio characteristics or the visual characteristics with respect to interaction with the online identity or resource.

DESCRIPTION OF DRAWINGS

FIG. 1 shows an example of a GUI configured to receive instructions, from a user, for output controls for communications with a particular online identity.

FIG. 6 shows a flow chart of an example of a process by which a communications session between a user and an online identity "BestFriend" is controlled based on instructions for output controls, provided by the user, and associated with the online identity "BestFriend."

DETAILED DESCRIPTION

Figure 2:
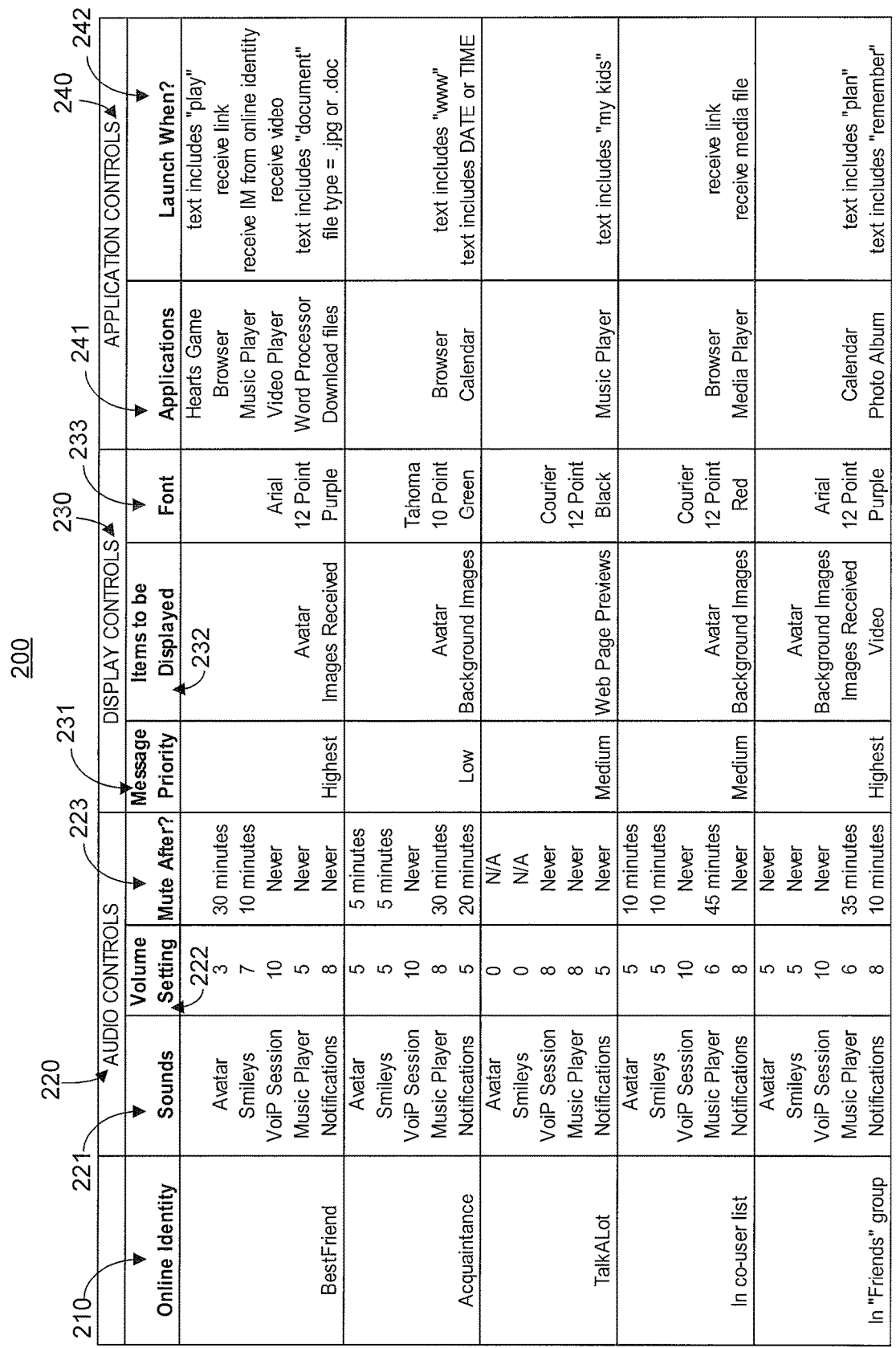
FIG. 2 shows an example of a configuration file for storing output controls, provided by a user, in association with one or more online identities.

A communications session between a user and an online identity may include various sounds, display characteristics, and actions. For example, receipt of an instant message (IM) from an online identity may trigger display of an avatar selected by the online identity, as well as playback of sounds associated with the avatar. The user may seek to configure the sounds, display characteristics, and actions associated with such a communications session. Moreover, there may be situations in which the user seeks to configure sounds, display characteristics, and actions associated with a communications session differently depending on the online identity with whom the user is engaging in the communications session and then users may wish for their configuration settings to persist and apply to future session involving such a user. Additionally, the user may seek to configure sounds, display characteristics, and/or actions associated with a communications session or all communication sessions on a per-online identity basis.

For example, the user may seek to receive sounds associated with a communications session with an online identity with whom the user communicates infrequently in order to signal to the user that the online identity, with whom the user does not communicate on a regular basis, seeks the user's attention. In contrast, the user may seek to mute (or diminish the volume otherwise associated with) some or all sounds associated with a communications session between the user and an online identity with whom the user communicates frequently because the user finds constant sounds, which would be played often based on the amount of communication between the user and the online identity, a distraction.

In addition to communications sessions, sounds, display characteristics, and/or actions may be associated with particular online resources, including web pages or events, such as, for example, receipt of an email having particular criteria or playback of a particular song. The user may be made able to configure the sounds, display characteristics, and/or actions associated with the online resources or events on a per-resource or per-event basis. For example, the user may configure audio controls for a particular web page to play sounds embedded within the particular web page at a volume setting of 5 (on a scale of 0-10, with 0 being no sound, and 10 being loudest sound) if the sounds are associated with content, while sounds associated with advertisements may be muted or relatively lowered. In another example, the user may configure display controls associated with messages having a particular word in the subject line, such that images included within such messages are displayed when the user opens or views the message.

Techniques are provided for receiving, from a user, instructions for output controls that (1) may include audio controls, display controls, and/or application controls, and (2) may be associated with an online identity and/or an online resource. The output controls may be stored in association with the online identity or online resource. An interaction between the user and the online identity or online resource may be detected. The user's interaction with the online identity or the online resource may be controlled based on the output controls associated with the online identity.

GUI 100 of FIG. 1 is an example of a GUI configured to receive instructions, from a user, for output controls for communications with a particular online identity. More particularly, GUI 100 enables a user to identify a particular online identity, and configure audio controls, display controls, and application controls to be associated with a communications session between the user and the particular online identity.

As shown in GUI 100, the user has selected the online identity "BestFriend" 110. The name "BestFriend" may be a screen name or other identifier associated with a particular person whom the user knows. Additionally, or alternatively, the user may select an online identity by providing an email address, telephone number, or other contact information which may uniquely identify the online identity. The user may select the online identity "BestFriend" by typing the identifier "BestFriend," into a text entry box, by selecting the online identity "BestFriend" from a drop-down menu, or by selecting the online identity "BestFriend" from an interface outside GUI 100, such as, for example, from within a co-user list (e.g., Buddy List). In some implementations, selection of the online identity by the user from outside GUI 100 may cause the user to be presented with GUI 100. Alternatively, the user may be presented with a GUI other than GUI 100 that is also configured to receive instructions for output controls from the user to be associated with the selected online identity.

GUI 100 includes three types of output controls: (1) audio controls 120, (2) display controls 130, and (3) application controls 140. Audio controls 120 may be controls associated with particular types of sounds, as well as volume settings and mute settings for the sound types. As such, the user may provide volume settings and mute settings for a variety of different types of sounds. As shown, the user has provided audio controls for sounds 121 associated with an avatar (e.g., an animated or static icon), smileys (e.g., emoticons), a voice-over-IP (VoIP) session (e.g., an AIM Talk Session®), a music player (e.g., iTunes®), and notifications (e.g., audio notifications associated with applications, such as a sound indicating the receipt of a new email message, a sound alerting the user that a document has been auto-saved, and a sound indicating that the downloading of a file has been completed).

The user may be enabled to provide volume settings 122, based on a scale of 0-10, with 0 being no sound, and 10 being the loudest sound level, for each of the sound types 121. Alternatively, the volume settings may be associated with a different scale, such as, for example, decibel (dB) levels. As shown, and for example, the user has selected a volume setting of 3 for sounds associated with an avatar and a volume setting of 7 for sounds associated with smileys. The user also may be enabled to provide mute settings 123 for each of the sound types 121. A mute setting may relate to a period of time after initiation of a communications session (e.g., an instant messaging communications session, a VoIP session, or a chat session) during which a particular sound may no longer be played. For example, and as shown, the user has indicated that sounds associated with an avatar should be muted after 30 minutes and sounds associated with a music player should never be muted.

The audio controls 120 include an "Add more" hyperlink 124, selection of which may enable a user to add an additional sound type and associated volume setting and mute setting to the audio controls 120. Upon selection of the "Add more" hyperlink 124, the user may select an additional sound type by entering the sound type into a text box, selecting the sound type from a drop-down menu, or otherwise.

Display controls 130 may be controls associated with visual display characteristics for a communications session between the user and the selected online identity. More particularly, display controls 130 may include message priority information 131, a list of items to be displayed 132, and font information 133. The user may be enabled to provide message priority information 131 to be associated with a communications session between the user and the selected online identity. As shown, the user may select from message priority levels of highest, high, medium, low, and lowest, and has selected the "highest" message priority level to be associated with a message included in a communications session between the user and the selected online identity. In some implementations, the message may refer to an IM received from the selected online identity. Additionally or alternatively, the message may refer to an email message, a text message, a voicemail message, or some other message type received from the selected online identity, or sent, by the user, to the selected online identity.

The user may be enabled to provide a list of items to be displayed 132. As shown, the user may select one or more of an avatar, background images (e.g., IM wallpaper or an email message background image), images received from the selected online identity (e.g., picture files sent in a message), web page previews (e.g., thumbnail images of a web page associated with a hyperlink included in a message), or video. The user may select the items using the associated checkboxes. As shown, the user has selected to display avatars associated with a communications session between the user and the selected online identity and images received from the selected online identity. The user also may add additional types of items to the list (for selection or not) by selecting the "Add more" hyperlink 134.

The user also may be enabled to provide font information 133 for display of text included within a communications session between the user and the selected online identity. More particularly, and as shown, the user may provide a font name (e.g., Arial), a font size (e.g., 12 point), and a font color (e.g., purple) in which text included in a communications session between the user and the online identity "BestFriend" may be displayed. In some implementations (not shown), the user may elect to receive text from the selected online identity based on formatting selected by the online identity from whom the text is received.

Application controls 140 may be controls that allow the user to indicate particular applications or programs 141 that may be launched at particular times or based on particular events 142. Application controls 140 also may be referred to as action controls because the controls are associated with performing an action (e.g., launching an application). For example, and as shown, the user has indicated that an application associated with a hearts game may be launched when text included in a communications session between the user and the selected online identity includes the word "play." In another example, and as also shown, files received by the user from the selected online identity may be downloaded if the files have a type of .jpg or .doc. The user may add additional application controls 140 by selecting the "Add more" hyperlink 143.

The controls 120, 130, and 140 may be associated with capture as well as rendering. In particular, the audio controls 120 may include a control for a microphone volume level of captured audio or may include other audio capture characteristics. For example, an output control specifying a low microphone volume level may be stored for communication sessions with the online identity BestFriend 110, and a high output control may be stored for communication sessions for different online identities. Consequently, the output controls enable a lower volume of captured audio to be sent to BestFriend 110, and thus, the user BestFriend 110 experiences a lower audio level in communication sessions. Further, the display controls 130 may include controls for the camera brightness of captured images or video for display or may include other display capture characteristics. The controls 120, 130, and 140 may include other capture characteristics, such as, microphone gain level, microphone bass/treble level, webcam contrast level, or other characteristics.

Configuration file 200 of FIG. 2 is an example of a configuration file for storing output controls, provided by a user, in association with one or more online identities. The information included in configuration file 200 may be provided by the user using, for example, GUI 100 of FIG. 1.

Configuration file 200 may include a list of online identities 210. As shown, the online identities 210 include particular online identities of "BestFriend," "Acquaintance," and "TalkALot." The online identities 210 also include groups of online identities, such as, and as shown, online identities in a co-user list associated with the user, and online identities in a group labeled "Friends."

In association with each online identity or group of online identities, configuration file 200 may store output controls that include audio controls 220, display controls 230, and application controls 240. Audio controls 220, display controls 230, and application controls 240 may include the controls for which instructions were provided by the user using GUI 100 of FIG. 1.

Audio controls 220 may include sound types 221, as well as volume settings 222 and mute settings 223 for each of the sound types 221. Display controls 230 may include a message priority 231, a list of items to be displayed 232, and font information 233 for each online identity 210. Application controls 240 may include a list of applications or actions 241 and launch information 242 regarding when the applications may be launched or when the actions may be performed.

For example, and as shown, for online identity "Acquaintance," each of the sound types available to the user for control in GUI 100 of FIG. 1 are shown as sound types 221—namely sounds associated with an avatar, smileys, a voice-over-IP (VoIP) session, a music player, and notifications. A volume setting of 5 is associated with avatar sounds, smiley sounds, and notifications, a volume setting of 10 is associated with VoIP session sounds, and a volume setting of 8 is associated with music player sounds. The volume settings for each sound type 221 may take effect when the user is engaged in a communications session with online identity "Acquaintance." After initiation of the communications session, avatar sounds and smiley sounds are each muted after 5 minutes, VoIP session sounds are never muted, music player sounds are muted after 30 minutes, and notification sounds are muted after 20 minutes. The mute settings may indicate a desire on the part of the user to never mute an active VoIP session, to mute sounds associated with the communications session (e.g., avatar and smiley sounds) after a short period of time because, for example, these types of sounds tend to repeat, and to mute sounds associated with information outside the communications session (e.g., music player sounds and notifications) only when the communications session has lasted for an extended period of time indicating, for example, a more important communications session during which the user seeks not to be disturbed. In some implementations, only sound types for which a volume setting and/or a mute setting has been provided by the user may be included in the configuration file 200.

Continuing the example of online identity "Acquaintance," display controls 230 include a message priority 231 of low, as provided by the user. As such, and in some implementations, a low message priority may provide for a communications session display that includes messages (e.g., IM, text, or speech-to-text converted voicemail) from the online identity "Acquaintance" to be provided to the user in a subdued (or minimized) state. Additionally, the display associated with messages received from the online identity "Acquaintance" may be presented to the user only when other, higher priority, messages or applications are not presently active. In some implementations, messages (e.g., email, text, or voicemail) received from the online identity "Acquaintance" may be presented to the user in a list (e.g., a message inbox) at a lower position than higher priority messages. Additionally, such messages received from the online identity "Acquaintance" may be presented to the user only after the user has been provided with higher priority messages received by the user, for example, within a particular time frame surrounding receipt of the message from the online identity "Acquaintance."

As also shown, a list of items to be displayed 232 in association with a communications session between the user and the online identity "Acquaintance," have been provided by the user, and include avatars and background images. Font information 233 indicates that text included in messages from the online identity "Acquaintance" is to be displayed in a font of Tahoma, in 10 point size, and as the color green.

Configuration file 200 also includes application controls 240 associated with online identity "Acquaintance." The application controls 240 may include launching an application 241, such as, for example, a browser application, upon the occurrence of a particular event 242, such as, for example, when text included in a communications session between the user and the online identity "Acquaintance" includes "www." In another example, and as also shown, a calendar application may be launched when text included in the communications session between the user and the online identity "Acquaintance" includes a date or time. In some implementations, text that includes a date or time may be recognized based on predetermined information, such as, for example, letter and/or number formatting that indicates a date or a time.

Figure 3:
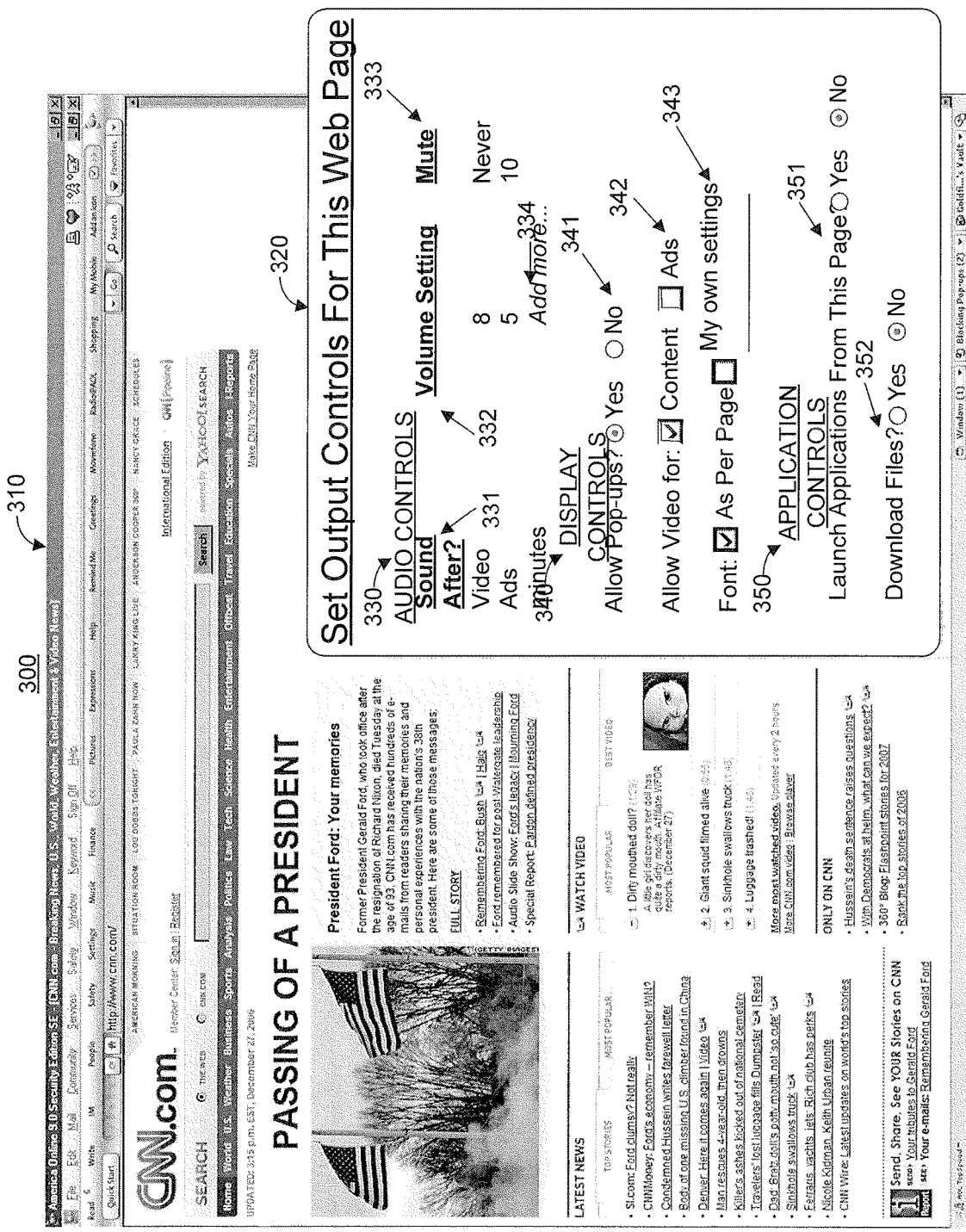
FIG. 3 shows an example of a GUI that includes a browser window displaying a web page and an output controls window configured to receive, from a user, instructions for output controls to be associated with the displayed web page.

GUI 300 of FIG. 3 is an example of a GUI that includes a browser window 310 displaying a web page and an output controls window 320 configured to receive, from a user, instructions for output controls to be associated with the displayed web page. The output controls window 320 may enable a user to provide output control information for the presentation of web pages in browser window 320 on a per-web page basis. In some implementations, output controls window 320 may be provided to the user as a pop-up window in response to browser window 310 loading a web page with which no output control information has been associated and stored.

More particularly, browser window 310 displays the CNN web page, which is associated with a uniform resource locator (URL) of http://www.cnn.com. A user who has navigated browser window 310 to the CNN web page may be presented with output controls window 320 by which the user may provide output control information for current and future presentation of the CNN web page.

Output controls window 320 includes audio controls 330, display controls 340, and application controls 350. Audio controls 330 may enable the user to provide particular sound types 331 (e.g., sounds associated with video embedded in the web page or advertisements shown in the web page), as well as volume settings 332 (e.g., on a scale of 0 to 10, as discussed above) and mute settings 333 (e.g., an amount of time after which the web page is loaded that the particular sounds may be muted) to be associated with the particular sound types. For example, and as shown, the user has indicated that video sounds may be played at a volume setting of 8 and are never muted, while sounds associated with advertisements are to be played at a volume setting of 5 and muted 10 minutes after the web page is initially loaded. To add an additional sound type to the audio controls 330, the user may select "Add more" hyperlink 334.

Display controls 340, which are also included in output controls window 320, may include controls for presentation elements associated with the web page displayed in the browser window 310. For example, and as shown, the user may select whether to allow pop-ups 341 initiated by the CNN web page, a list of content types 342 (e.g., substantive web page content or ads) for which video included in the CNN web page is to be rendered, and font information 343 for whether the text within the CNN web page is to be displayed as provided by the web page, itself, or based on user-defined font information.

Output controls window 320 also includes application controls 350. The application controls 350 may allow the user to configure whether, and when, to perform particular actions associated with applications or programs launched by the CNN web page. As shown, the user may be enabled to decide whether to allow applications (e.g., a media player to display video content) to be launched from the web page 351, and whether to allow files included in the web page (e.g., video files) to be automatically downloaded 352.

In some implementations, output controls also may be configured by a user for online resources other than web pages. In one implementation, a user may configure output controls for email messages that meet particular criteria. As such, the user may configure audio controls to be associated with incoming email messages that meet particular criteria, such as, for example, a sound to be played when such messages are received or whether, and when, sounds embedded in such an email message is to be played. The user may configure display controls, including, for example, font information for email messages that meet particular criteria, whether to display images included in such an email message, and whether to provide a visual notification when such email messages are received. The user also may configure application controls such as, for example, whether to launch a browser application when an email message that meets particular criteria includes a hyperlink.

Each of the output controls associated with email messages may be based on whether a particular email message meets particular criteria. The particular criteria may include an online identity from which the email message is received, a particular subject associated with the email, a time of day when the email message is received, whether the email includes an attachment, or a size of the email message or attachment. For example, an audio control may indicate that a sound is to be played at a volume setting of 5 when an email message is received from the online identity "BestFriend." In another example, a display control may indicate that images included in an email message having particular words in the subject line, or being associated with a category (to which words in the subject line belong) may be displayed. In a third example, an application control may indicate that an attachment to an email message having a size that is smaller than 10 MB, may be downloaded automatically without specific user approval.

In another implementation, a user may configure output controls for a media player. The user may provide audio controls, display controls, and application controls for a media player based on particular criteria associated with media (e.g., songs, video, or images) rendered by the media player. More particularly, output controls may be configured for a media player on, for example, a per-song, per-artist, per-media source, or per-media category basis. For example, the user may configure an audio control to add a particular song to a current playlist whenever a song by the artist Madonna is played by the media player. In a second example, the user may configure a display control to change the font of a song title in a playlist for all songs that were received from a particular source (e.g., downloaded from a particular online music provider). In a third example, the user may configure an application control to launch a photograph album application whenever the media player renders a video associated with a label of "friends" or "family" (e.g., whenever the media player plays a home movie).

Figure 4:
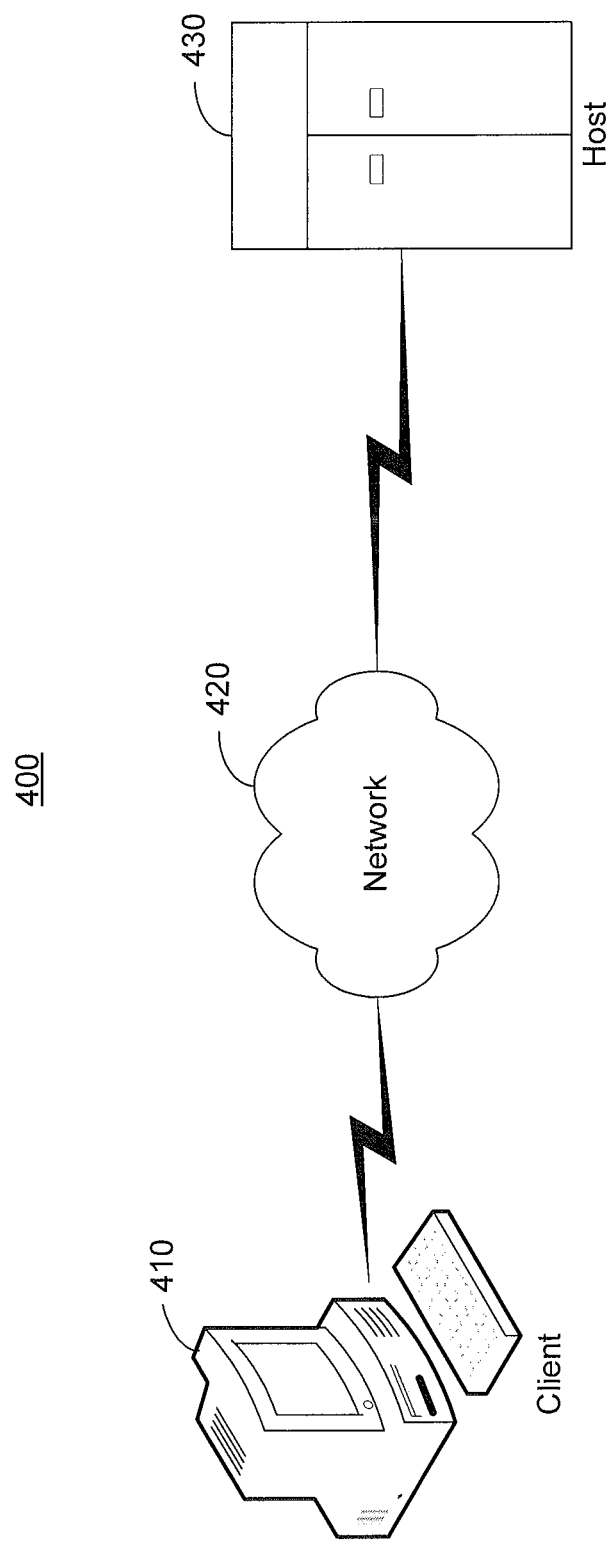
FIG. 4 shows a block diagram that is an example of a communications system that includes a host connected to a client over a network.

Block diagram 400 of FIG. 4 is an example of a communications system that includes a host 430 connected to a client 410 over a network 420. A user associated with the client 410 may participate in a communications session with a particular online identity when messages (e.g., IM, text, or voice messages) are sent from the client 410 through the network 420 to the host 430 for transmittal to another client device associated with the particular online identity. Additionally, the user associated with the client 410 may receive online resources (e.g., a web page) through the connection between the client 410 and the host 430 over the network 420.

Each of the client 410 and the host 430 may be implemented by, for example, a general-purpose computer capable of responding to and executing instructions in a defined manner, a personal computer, a special-purpose computer, a workstation, a server, a device, a component, other equipment or some combination thereof capable of responding to and executing instructions. The client 410 and host 430 may be configured to receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to the client 410 or the host 430.

The client 410 may include one or more devices capable of accessing content on the host 430. The host 430 may include a general-purpose computer (e.g., a personal computer (PC)) capable of responding to and executing instructions in a defined manner, a workstation, a notebook computer, a PDA ("Personal Digital Assistant"), a wireless phone, a component, other equipment, or some combination of these items that is capable of responding to and executing instructions.

In one implementation, the client 410 includes one or more information retrieval software applications (e.g., a browser, a mail application, an instant messaging client, an Internet service provider client, a media player, or another integrated client) capable of receiving one or more data units. The information retrieval applications may run on a general-purpose operating system and a hardware platform that includes a general-purpose processor and specialized hardware for graphics, communications and/or other capabilities. In another implementation, the client 410 may include a wireless telephone running a micro-browser application on a reduced operating system with general purpose and specialized hardware capable of operating in mobile environments.

The network 420 includes hardware and/or software capable of enabling direct or indirect communications between the client 410 and the host 430. As such, the network 420 may include a direct link between the client 410 and the host 430, or it may include one or more networks or sub networks between them (not shown). Each network or sub network may include, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

The host 430 generally includes one or more devices configured to receive a query face and return search result images that include faces determined to be similar to the query face. Typically, a host 430 includes similarity information related to the user's perception of facial similarity. The host 430 may include a general-purpose computer having a central processor unit (CPU), and memory/storage devices that store data and various programs such as an operating system and one or more application programs. Other examples of a host 430 includes a workstation, a server, a special purpose device or component, a broadcast system, other equipment, or some combination thereof capable of responding to and executing instructions in a defined manner. The host 430 also may include an input/output (I/O) device (e.g., video and audio input and conversion capability), and peripheral equipment such as a communications card or device (e.g., a modem or a network adapter) for exchanging data with the network 420.

The host 430 is generally capable of executing instructions under the command of a controller. The host 430 may be used to provide content to the client 410. The controller may be implemented by a software application loaded on the host 430 for commanding and directing communications exchanged with the client 410. Other examples of the controller include a program, a piece of code, an instruction, a device, a computer, a computer system, or a combination thereof, for independently or collectively instructing the client 410 or the host 430 to interact and operate as described. The host 430 may be embodied permanently or temporarily in any type of machine, component, physical or virtual equipment, storage medium, or propagated signal capable of providing instructions to the client 410 or the host 430.

Output controls configuration files, such as, for example, configuration file 200 of FIG. 2, may be stored at the client 410. The client 410 may be configured to detect an interaction between a user associated with the client 410 and a particular online identity. The interaction may be initiation of a communications session (e.g., an IM communications session, a VoIP session, or a chat session) between the user and the particular online identity based on the user receiving a message (e.g., an IM, a spoken sentence, or a chat message) from the particular online identity or the user sending a message to the online identity.

Upon detecting an interaction between the user and the particular online identity, the client 410 may access the output controls configuration files to determine if there exist output controls associated with the particular online identity. If output controls are associated with the particular online identity, the client 410 may tailor audio controls, display controls, and application controls associated with the communications session based on the output controls. Alternatively, the configuration files may be stored at the host 430, and the client 410 may access the configuration files at the host 430 through network 420.

In order to tailor the communications session based on the output controls, the client 410 may, in some implementations, directly alter presentation settings (e.g., volume settings) associated with the client 410. For example, if an audio control indicates that a volume setting for avatar sounds is to be 7, the client 410 may adjust the volume setting associated with the client 410 to a level of 7 whenever a sound associated with an avatar is played. Additionally, or alternatively, the client 410 may include, or be associated with, an additional layer of configurability (e.g., a middle application) that is configured to scale presentation settings associated with the client 410 in order to satisfy a particular output setting, without requiring that the presentation setting associated with the client 410, itself, be altered. For example, the middle application may configure the audio control that provides for an avatar sound volume setting of 7 to not interfere with the client 410 volume settings, but, rather scale the client 410 volume settings, from a current level, to a level of 7, whenever a sound associated with an avatar is to be played. More particularly, if an avatar sound is to be played at a volume setting of 7, and the client 410 volume setting is at a current level of 10, when an avatar sound is to be played, the middle application intercepts the avatar sound and scales the volume setting for the avatar sound from a level of 10 down to a level of 7 in order to comply with the audio control without changing the real volume setting associated with the client 410.

Figure 5:
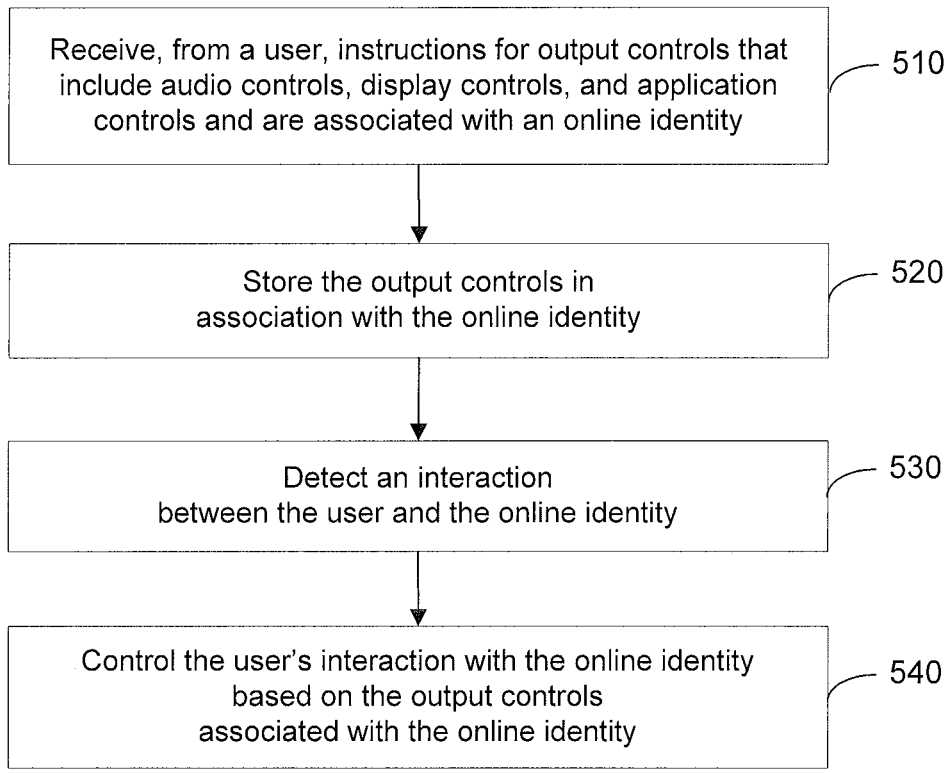
FIG. 5 shows a flow chart of an example of a process by which a user's interaction with an online identity is controlled based on instructions for output controls, provided by the user, and associated with the online identity.

Flow chart 500 of FIG. 5 is of an example of a process by which a user's interaction with an online identity is controlled based on instructions for output controls, provided by the user, and associated with the online identity. Generally, the operations of the process shown in flow chart 500 may be used in conjunction with the systems and configurations described earlier in FIG. 4. For example, the process shown in flow chart 500 may be performed by client 410. For convenience, client 410 of FIG. 4 is referenced as performing the process. However, similar methodologies may be applied in other implementations where different components are used to define the structure of the system, or where the functionality is distributed differently among the components shown.

Client 410 receives, from a user, instructions for output controls that include audio controls, display controls, and application controls and are associated with an online identity (510). The client 410 may receive instructions for the output controls from the user through a GUI, such as, for example, GUI 100 of FIG. 1. The output controls may be associated with an online identity referenced by a screen name or other identifier (e.g., a telephone number or email address). For example, the output controls may be associated with an online identity having the screen name "BestFriend."

As discussed in detail above, the output controls may include audio controls, display controls, and application controls. The audio controls may include particular types of sounds, and, for each type of sound, an associated volume setting and mute setting. The display controls may include a priority control to be associated with messages (e.g., IM, email, text or voicemail) received from the online identity with which the output controls are associated, a list of items to be displayed in connection with a communications session between the user and the online identity, and font information to control display of text included in messages that are part of the communications session. The application controls may include a list of particular applications (e.g., a browser) or actions (e.g., download files) and an indication as to when the applications are to be launched or when the actions are to be performed.

Additionally or alternatively, rather than being associated with an online identity, the output controls may be associated with a resource (e.g., a particular web page, an email message meeting particular criteria, or media meeting particular criteria). As discussed above, and for example, instructions for output controls associated with a particular web page may be provided by a user using a GUI, such as, for example, output controls window 320 of FIG. 3. The output controls associated with the web page may include audio controls (e.g., particular sounds and associated volume and mute settings), display controls (e.g., whether to allow pop-ups initiated by the web page, whether to allow the web page to display images or video, and how to display text included in the web page), and application controls (e.g., whether to allow applications to be launched by the web page and whether to allow files associated with the web page to be downloaded).

Client 410 stores the output controls in association with the online identity (520). The client 410 may store the output controls in a configuration file, such as, for example, configuration file 200 of FIG. 2. The configuration file may include a list of online identities and output controls, including audio controls, display controls, and application controls associated with each online identity.

In implementations where output controls are not associated with online identities, but rather, are associated with particular online resources, such as web pages, client 410 may store the output controls provided by the user in association with an identifier for the web page. For example, the output controls may be stored in association with a URL for the particular web page (e.g., www.cnn.com/local) or a domain name (e.g., cnn.com)

Client 410 detects an interaction between the user and the online identity (530). An interaction between the user and the online identity may include initiation of a communications session by either party, which may include receipt, by the user, of a message (e.g., IM, text message, email, or voicemail) from the online identity or a message being sent, from the user, to the online identity. An interaction also may include the online identity becoming available to participate in a communications session (e.g., coming back from an away or busy state or signing on to an instant messaging service).

In implementations where the output controls are associated with online resources other than online identities, the client 410 may detect an interaction between the user and the online resource. As such, and for example, the client 410 may detect a browser being navigated by the user to a URL with which output controls are associated. Similarly, the client 410 may detect receipt of an email message, by the user, that meets particular criteria (e.g., a particular subject line, is from a particular online identity, or includes an attachment) that is associated with output controls. Additionally, or alternatively, the client 410 may detect initiation of a media resource that is associated with particular criteria (e.g., playing a song by a particular artist or rendering a video received from a particular source) by a media player, where the media resource that meets the particular criteria is associated with output controls.

In some implementations, client 410 may monitor applications and input/output information for interactions that are associated with an online identity or online resource (e.g., web page) with which output controls have been associated. Alternatively, or additionally, client 410 may monitor applications and input/output information for any interactions. In this implementation, when an interaction is detected, the client 410 may determine an online identity or online resource associated with the interaction and access a configuration file (e.g., configuration file 200 of FIG. 2) to determine if the determined online identity or online resource is an online identity or online resource with which output controls have been associated.

Client 410 controls the user's interaction with the online identity based on the output controls associated with the online identity (540). The client 410 may control the audio, display, and application aspects of a communications session between the user and the online identity based on output controls associated with the online identity. For example, if output controls associated with the online identity "BestFriend" include display controls configured to present text included in messages sent between the user and the online identity in a particular font (e.g., Arial, 12 point, purple), all text included in messages between the user and the online identity "BestFriend" may be presented in the particular font.

In some implementations, the user's interaction with an online resource (e.g., a web page or an email message or media that meets particular criteria) may be controlled by the client 410 based on the output controls associated with the online resource. For example, if display controls associated with a particular web page indicate that pop-ups initiated by the web page are disallowed, the client 410 may control the user's interaction with the particular web page such that when the user navigates to the web page, the user may not be presented with any pop-ups associated with the web page.

Flow chart 600 of FIG. 6 is an example of a process by which a communications session between a user and an online identity "BestFriend" is controlled based on instructions for output controls, provided by the user, and associated with the online identity "BestFriend." Generally, the operations of the process shown in flow chart 600 may be used in conjunction with the systems and configurations described earlier in FIG. 4. For example, the process shown in flow chart 600 may be performed by client 410. For convenience, client 410 of FIG. 4 is referenced as performing the process. However, similar methodologies may be applied in other implementations where different components are used to define the structure of the system, or where the functionality is distributed differently among the components shown.

Client 410 receives, from a user, instructions for an audio control indicating that sounds associated with an avatar are to be played at a volume setting of 3 and are to be muted 30 minutes after initiation of a communications session between the user and an online identity of "BestFriend" (610). The instructions for an audio control may be included in instructions for output controls provided by the user using, for example, GUI 100 of FIG. 1. The user may provide the online identity "BestFriend" as the online identity for which the user seeks to provide output controls. By providing a particular audio control for sounds associated with an avatar, the user may seek to control sounds associated with an avatar (e.g., an animated or static icon) displayed in connection with, for example, an instant messaging communications session between the user and the online identity "BestFriend."

Client 410 stores the audio control in association with the online identity "BestFriend" (620). The audio control may be stored in association with the online identity "BestFriend" in a configuration file, such as, for example, the configuration file 200 of FIG. 2. As such, the online identity "BestFriend" may be associated with the audio control provided by the user, such that, whenever an interaction takes place between the user and the online identity "BestFriend," the audio characteristics of the interaction (e.g., sounds associated with an avatar displayed in connection with the communications session) may be controlled based on the audio control associated with the online identity "BestFriend."

Client 410 detects an IM received by the user from the online identity "BestFriend" (630). As discussed above, the client 410 may monitor messages (e.g., IM, email, text, or voice) to determine if a message received by the user was sent from the online identity "BestFriend." Alternatively, the client 410 may monitor all messages received by the user, determine an online identity associated with each received message (e.g., the online identity "BestFriend"), and assess whether the determined online identity is associated with output controls. In either case, and in the present example, the client 410 detects an IM received by the user from the online identity "BestFriend."

Client 410 plays sounds associated with an avatar displayed in connection with the communications session between the user and the online identity "BestFriend" at a volume setting of 3, and mutes the sounds associated with the avatar after 30 minutes (640). An instant messaging communications session display may be configured to enable the user to provide messages to online identity "BestFriend" and view a history of all messages sent between the user and the online identity "BestFriend" during the communications session. The display also may present an avatar selected by online identity "BestFriend," such as, for example, an animated music note, which the online identity "BestFriend" selected to represent that the online identity "BestFriend" plays the guitar. The animated music note avatar may be associated with various sounds, such as, for example, the words "hello there" being played (and shown as being said by the animated music note avatar) whenever the words "hi," "hello," or "yo" are included in a message in the communications session. According to the audio controls associated with the online identity "BestFriend," playback of the words "hello there," as well as any other sounds associated with the animated music note avatar (or another avatar selected by the online identity "BestFriend") may be played at a volume setting of 3. Additionally, and also based on the output controls, all sounds associated with the avatar may be muted 30 minutes after initiation of the communications session between the user and the online identity "BestFriend."

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made.

What is claimed is:

1. A computer implemented method comprising: receiving, at a client device, an instruction set from a user via a graphical user interface (GUI) of the client device, wherein the instruction set includes configuration information for at least one of a user identity and an online resource, wherein the configuration information includes one or more of audio control information, visual control information, and application control information, wherein each of the audio control information, the visual control information, and the application control information correspond to an electronic communication between the client device and one of the user identity and the online resource; receiving, at the client device, an indication that the user interacted with a first user identity via a first electronic communication between the user and the first user identity; and based on the received instruction set from the user, modifying one or more of an audio parameter, a video parameter, and an application parameter of the first electronic communication between the user and the first user identity, wherein i) one or more audio parameters are modified based on the audio control information and include mute settings for a first sound type and a second sound type, wherein the mute settings apply to one of the first sound type and the second sound type for a predetermined period of time, ii) one or more visual para meters a remodified based on the visual control information, and iii) one or more of the application parameters a remodified based on the application control information.

2. The computer implemented method of claim 1, wherein the user identity and the online resource are associated with one of an avatar and a web page.

3. The computer implemented method of claim 2, wherein:
modifying one or more of the application parameters correspond with an interaction between the user and the web page.

4. The computer implemented method of claim 3, wherein modifying application control information includes modifying one or more interactive features of the web page.

5. The computer implemented method of claim 3, wherein modifying one or more visual parameters includes controlling visual characteristics of the avatar and the web page.

6. The computer implemented method of claim 1, wherein the received instruction set correspond to one or more features of an electronic message.

7. The computer implemented method of claim 1, wherein the received instruction set includes receiving instructions for output controls that are associated with media that meets particular criteria.

8. The computer implemented method of claim 7, wherein:
wherein the audio parameters correspond with the rendering, capture, or playback of media, and
enabling an effect includes controlling audio characteristics associated with the media or visual characteristics associated with the media.

9. The computer implemented method of claim 1, wherein the received instructions are associated with an online resource includes receiving instructions for output controls that are associated with the online identity.

10. The computer implemented method of claim 9, wherein the online identity is a first user with a first screen name, and enabling an effect includes:
detecting initiation or existence of an instant messaging communications session with the first user; and
further comprising one or more of the following:
rendering audio output related to the instant messaging communications session using audio controls included in the output controls, or
rendering an instant messaging related to the instant messaging communications session using visual controls included in the output controls.

11. The computer implemented method of claim 10, wherein rendering audio output related to the instant messaging communications session using the audio controls includes capturing particular sounds using a microphone level indicated in the audio controls.

12. The computer implemented method of claim 10, wherein rendering audio output related to the instant messaging communications session using the audio controls includes:
rendering particular sounds indicated in the audio controls based on volume settings associated with the particular sounds or a microphone and included in the audio controls; and
muting the particular sounds after an amount of time associated with the particular sounds and included in the audio controls has elapsed.

13. The computer implemented method of claim 10, wherein the visual parameters include a priority setting, and rendering the instant messaging related to the instant messaging communications session using the visual controls includes:
rendering an instant messaging at a forefront of a display of the device associated with the first identity based on whether the priority setting indicates that communications with the first screen name should be prioritized; and
rendering an instant messaging related to the instant messaging session in a subdued manner on the display of the device based on whether the priority setting indicates that communications with the first screen name should be subdued.

14. The computer implemented method of claim 10, wherein the visual parameters include a list of items to be displayed, and rendering the instant messaging related to the instant messaging communications session using the visual controls includes rendering the items included in the list of items.

15. A system comprising: a data storage device storing instructions for and a processor configured to execute the instructions to perform a method including: receiving, at a client device, an instruction set from a user via a graphical user interface (GUI) of the client device, wherein the instruction set includes configuration information for at least one of a user identity and an online resource, wherein the configuration information includes one or more of audio control information, visual control information, and application control information, wherein each of the audio control information, the visual control information, and the application control information correspond to an electronic communication between the client device and one of the user identity and the online resource; receiving, at the client device, an indication that the user interacted with a first user identity via a first electronic communication between the user and the first user identity; and based on the received instruction set from the user, modifying one or more of an audio parameter, a video parameter, and an application parameter of the first electronic communication between the user and the first user identity, wherein i) one or more audio parameters are modified based on the audio control information and include mute settings for a first sound type and a second sound type, wherein the mute settings apply to one of the first sound type and the second sound type for a predetermined period of time, ii) one or more visual para meters a remodified based on the visual control information, and iii) one or more of the application para meters a remodified based on the application control information.

16. The method of claim 15, wherein the user identify and the online resource are associated with one of an avatar and a web page.

17. The method of claim 16, wherein:
modifying one or more of the application parameters correspond with an interaction between the user and the web page.

18. The method of claim 17, wherein modifying application control information includes modifying one or more interactive features of the web page.

19. A non-transitory computer readable medium comprising: receiving, at a client device, an instruction set from a user via a graphical user interface (GUI) of the client device, wherein the instruction set includes configuration information for at least one of a user identity and an online resource, wherein the configuration information includes one or more of audio control information, visual control information, and application control information, wherein each of the audio control information, the visual control information, and the application control information correspond to an electronic communication between the client device and one of the user identity and the online resource; receiving, at the client device, an indication that the user interacted with a first user identity via a first electronic communication between the user and the first user identity; and based on the received instruction set from the user, modifying one or more of an audio parameter, a video parameter, and an application parameter of the first electronic communication between the user and the first user identity, wherein i) one or more audio parameters are modified based on the audio control information and include mute settings for a first sound type and a second sound type, wherein the mute settings apply to one of the first sound type and the second sound type for a predetermined period of time, ii) one or more visual parameters a remodified based on the visual control information, and iii) one or more of the application parameters are modified based on the application control information.

* * * * *